Inventor:

United States Patent Office 3,139,504
Patented June 30, 1964

3,139,504
MULTIPOINT SPOT WELDING MACHINE
Erich Ramstein, Wettingen, Aargau, and Hans-Ulrich Neidhardt, Zurich, Switzerland, assignors to H. A. Schlatter A.G., Zurich, Switzerland
Filed Feb. 21, 1961, Ser. No. 90,814
Claims priority, application Switzerland Feb. 23, 1960
10 Claims. (Cl. 219—56)

This invention relates to electric welding and is more particularly concerned with an electric welding machine adapted to effect a plurality of spot welds.

In machines of this type the welding electrodes are forced into contact with the work to be welded by means of fluid or hydraulic pressure devices. The machine of this invention is adapted to effect the welding of a plurality of longitudinally and transversely positioned wires or rods at their points of intersection to provide grid structures, particularly wire mesh to be used in reinforcing concrete building structures.

Prior art machines of this type are usually provided with two support members each of which extends the whole length of the machine. One electrode of each pair of electrodes is secured to one of the support members and the other electrode of the electrode pair is mounted on the other support member. With this type of arrangement each support member must bear the sum of the welding pressures of all the pairs of electrodes provided in the machine. Due to this load on the electrode support members the machine must have a very strong supporting frame and be of a correspondingly heavy construction particularly when the number of the longitudinally and transversely extending wires or rods which are to be welded into the desired grid structures in increased or when the welding pressures have to be increased due to an increased diameter of these longitudinal and transverse work pieces.

In order to avoid these disadvantages the machine according to the invention is provided with at least one support member for each pair of electrodes which is adapted to bear at least a portion of the welding pressure of that pair of electrodes.

The support member is suitably arranged on that side of the associated pair of electrodes from which the longitudinal member is introduced into the machine for the purpose of welding it together with a transverse member, and each support member is provided with guide means for this longitudinal member. Each guide means is directed toward the axis of the corresponding electrode pair and extends into close proximity of the electrodes.

It is therefore an object of this invention to provide a multipoint electric welding machine in which each pair of welding electrodes has its own support means so that the welding pressures are more uniformly distributed to the machine structure.

It is another object of this invention to provide a multipoint electric welding machine in which the frame assembly is composed of lighter structural elements which may be easily assembled.

Additional objects and features of this invention will become apparent in the following detailed description when read in combination with the accompanying drawing in which.

Figure 1:
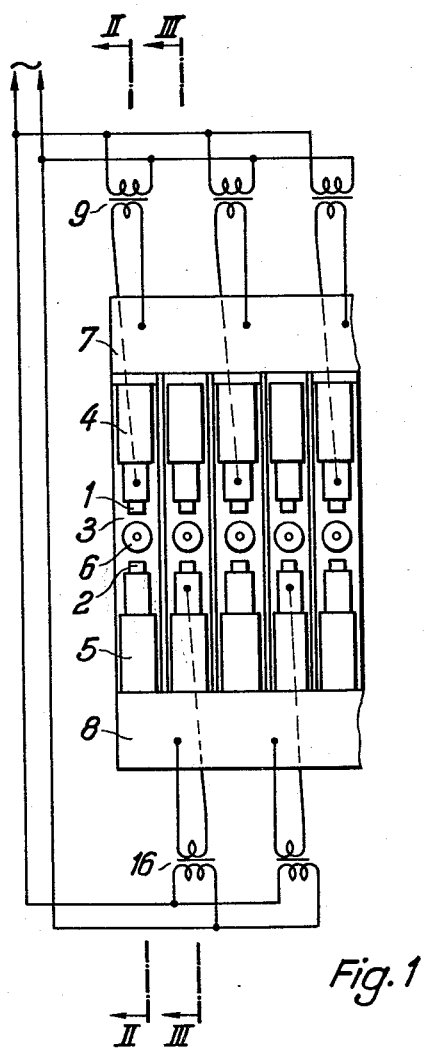
FIG. 1 is a front view of a portion of a multipoint welding machine for welding together longitudinal and transverse members to form desired grid structures.

The portion of the machine disclosed in FIGURE 1 comprises five pairs of electrodes and the essential functional elements which pertain thereto. The electrodes 1 and 2 of the first pair of electrodes are provided with a support member 3 which is shaped like a flat box and is mounted on the machine frame (not shown). Two hydraulic cylinders 4 and 5 are mounted respectively to the upper and lower portions of one of the front sides of this box like support member 3. These cylinders 4 and 5 are mounted in spaced relation and furnish the welding pressure for the associated electrodes 1 and 2. A guide sleeve 6 is mounted substantially centrally of the support member 3 and is electrically insulated therefrom. This guide sleeve 6 is adapted to guide the longitudinally introduced rod member to the spaced electrodes for the purpose of welding it together with the rod member which is introduced crosswise or transversely of the longitudinal rod member.

Figures 2, 3:
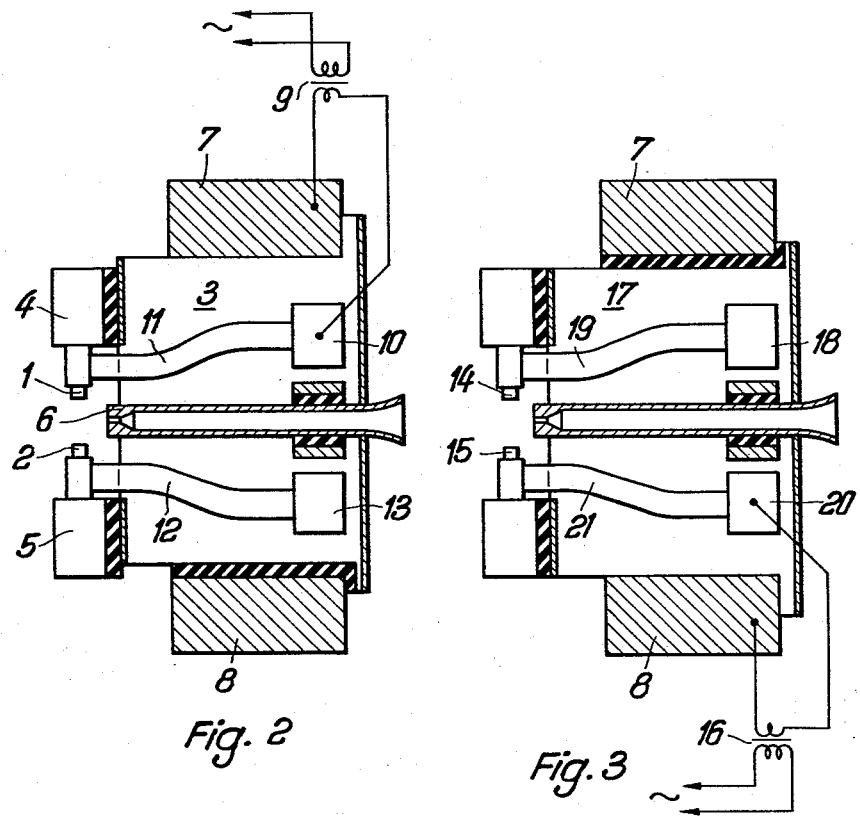
FIGURE 2 is a section along II—II of FIGURE 1.
FIGURE 3 is a section along line III—III of FIGURE 1.

In the same manner as the pair of electrodes 1 and 2 are mounted on support member 3 on one of the front sides of which the hydraulic cylinders 4 and 5 of the electrodes 1 and 2 are mounted, and on which a guide sleeve 6 is arranged for guiding the longitudinal rod or work piece to the electrodes 1 and 2, the second, third, fourth and any additional pairs of electrodes not shown in the drawing are each provided with a support member which carries on one front side thereof of the hydraulic cylinders of the electrodes and centrally thereof a guide sleeve for the longitudinal work piece which is conducted to the associated electrode. FIGURE 3 of the drawing illustrates this type of arrangement for the welding unit which comprises the second pair of electrodes 14 and 15.

The support members are arranged between an upper collector rail 7 and a lower collector rail 8. The first, third, fifth and every other alternate support member thereafter is electrically connected to the upper collector rail 7 and is insulated electrically from the lower collector rail 8, while the second, fourth and each alternate subsequent support member is electrically connected to the lower collector rail 8 and is electrically insulated from the upper collector rail 7. A suitable welding transformer is provided for each of welding electrodes. The welding transformer of the first, third, fifth and every alternate subsequent pair of electrodes is arranged above the support member for the associated pair of electrodes, while the welding transformer of the second, fourth and each alternate subsequent pair of electrodes is arranged below the support member associated with that particular pair of electrodes. One end of the secondary winding of each welding transformer is connected to the adjacent collector rail and the other end of the secondary winding is connected to the adjacent electrode of the associated pair of electrodes. As shown in FIGURE 2 of the drawing, one end of the secondary winding of a welding transformer 9 associated with the first pair of electrodes 1 and 2 is connected to collector rail 7. The other end of the secondary winding of transformer 9 is connected to a terminal member 10 which is secured to the support member 3 and insulated therefrom. Electrode 1 is connected to terminal member 10 through a flexible conductor 11. Electrode 2 in turn is connected by means of a flexible conductor 12 to a terminal member 13 which is connected to support member 3 in electrically conductive manner. The electrode 2 is connected to one end of the secondary winding of transformer 9 through support member 3 and collector rail 7. The electrical connection of the third, fifth and each subsequent alternate pair of electrodes is provided in same manner as the connection for electrode pair 1.

One end of the secondary winding of welding transformer 16 which is provided for the second pair of welding electrodes 14 and 15 is connected to the lower collector rail 8. This collector rail is electrically connected to support member 17 of the second pair of welding electrodes. A terminal member 18 is secured in electrically conductive relationship to support member 17 and the electrode 14 is electrically connected to this terminal member by means of a flexible conductor 19. The other end of the secondary winding of transformer 16 is connected to a terminal member 20 which is secured to support member 17 and insulated therefrom. Terminal 20 in turn is connected to electrode 15 by means of a flexible conductor 21. The electrical connections of the fourth, sixth and each alternate subsequent pair of welding electrodes are provided in the manner just described with reference to the second pair of electrodes 14 and 15.

As shown in FIGURE 1 of the drawing all the welding transformers of the machine are connected in such a manner that each pair of electrodes is fed by the same phase. This prevents a portion of the current from flowing during the welding operation from one electrode through a portion of an already welded transverse work piece to the adjacent electrode of another electrode pair instead of through the welding point. Such an undesirable current deviation occurs in machines in which the electrode pairs are not fed by current of the same phase. This is the case for example in machines in which two adjacent lower or upper electrodes are connected to each other and where each end of the secondary winding of the welding transformer is connected to one of the corresponding upper or lower electrodes.

All the electrodes and particularly the electrodes of each pair of electrodes are slideable independently of each other in an axial direction. The electrodes of each pair of electrodes are subjected to the same welding pressures but opposite to each other. In this manner a secure contact and pressure of the transverse work piece and the longitudinal work piece is provided at all the welding points even in the case where the longitudinal members or the transverse members are not linearly completely straight in the area of the welding points.

In order to adjust the welding machine so as to manufacture grid structures of varying intervals between the longitudinal rods the support members may be arranged so as to be slideable in the longitudinal direction of the collector rails.

As mentioned above, the welding pressure of each electrode pair is taken up substantially by its corresponding support member. The common axis of the electrodes of each pair of electrodes extends along the center plane of the corresponding support member so that the support member is not subjected to any bending stresses. This arrangement permits a relatively light frame structure for the welding machine. The mechanical stress of the collector rails is negligible. With the arrangement according to the invention there are no support members which are subject to the bending stress caused by the welding pressures of several or all of the electrode pairs as has been the case in prior art constructions. The welding machine of this invention may be erected on a support base of less weight and the frame structure may be made lighter than that of prior machines of this type so that it may be assembled faster and easier.

What is claimed is:

1. A multipoint electric welding machine for manufacturing grid-like structures comprising in combination a frame, a plurality of spaced support members arranged in parallel relationship on said frame, a pair of axially movable welding electrodes mounted in opposed axially aligned relationship on each of said support members, guide means on said support members for conducting longitudinal work pieces centrally between said pairs of electrodes substantially perpendicularly to the axis thereof, said support means being disposed on the side of the electrodes from which the longitudinal work pieces are guided between said electrodes, a pair of collector rails connected to said support members, and fluid operated cylinders for each of said electrodes for moving said electrodes relative to said opposed electrodes to exert a welding pressure against said longitudinal work pieces conducted centrally between said electrodes and like work pieces conducted between said electrodes transversely of said longitudinal work pieces.

2. A multipoint electric welding machine as defined in claim 1 wherein each pair of electrodes is provided with a welding transformer which is electrically connected to the support member of said pairs of electrodes in single pole relationship.

3. A multipoint electric welding machine as defined in claim 1 wherein the support members are mounted slideably relative to said collector rails.

4. A multipoint electric welding machine as defined in claim 1 wherein the axis of the electrodes of each pair of electrodes lies in the center plane of the corresponding support member.

5. A multipoint electric welding machine as defined in claim 1 wherein each electrode is axially moveable and wherein the fluid cylinders actuate the electrodes of each pair of electrodes toward each other with equal pressure.

6. A multipoint electric welding machine as defined in claim 1 wherein said support members constitute a conductive member for feeding the current for said collector rails to at least one of the electrodes carried by said support members.

7. A multipoint electric welding machine as defined in claim 1 wherein said electrodes are fed by electrical current of the same phase.

8. A multipoint electric welding machine for manufacturing grid-like structures comprising in combination a frame, longitudinal collector rails carried by said frame, a plurality of individual, spaced box-like electrode supports mounted on at least one of said longitudinal collector rails, a plurality of pairs of oppositely disposed axially aligned welding electrodes fixed one pair to each said electrode support, guide means for conducting longitudinal workpieces centrally between said pairs of electrodes substantially perpendicularly to the axis thereof, means for supplying welding current to said pairs of electrodes, devices mounted on each of said electrode supports for operating the electrodes of each pair of electrodes relative to each other to exert a welding pressure against said longitudinal workpieces conducted centrally between said electrodes and against like workpieces conducted between said electrodes transversely of said longitudinal workpieces.

9. A multipoint electric welding machine according to claim 8 wherein said box-like electrode supports have a flat form, said welding electrodes being mounted on the narrow front side of said flat box-like form.

10. A multipoint electric welding machine according to claim 8 wherein said electrode supports are of an electrically conductive material and conduct the current from said collector rails to at least one of the electrodes of the associated pair of welding electrodes.

References Cited in the file of this patent

UNITED STATES PATENTS

| | | |
|---|---|---|
| 2,422,829 | Fotie | June 24, 1947 |
| 2,588,062 | Vorderstrasse | Mar. 4, 1952 |